United States Patent

Fujibayashi

[11] 4,054,487
[45] Oct. 18, 1977

[54] NUCLEAR FUEL RODS

[75] Inventor: Toru Fujibayashi, Yokohama, Japan

[73] Assignees: Tokyo Shibaura Denki Kabushiki Kaisha, Kanagawa; Nippon Genshiryoku Jigyo Kabushiki Kaisha, Tokyo, both of Japan

[21] Appl. No.: 581,533

[22] Filed: May 28, 1975

[30] Foreign Application Priority Data

June 4, 1974  Japan .............................. 49-64071[U]

[51] Int. Cl.² .................................................. G21C 3/02
[52] U.S. Cl. ......................................... 176/68; 176/74; 176/93 BP
[58] Field of Search .................. 176/68, 73, 74, 79, 176/82, 93 BP

[56] References Cited

U.S. PATENT DOCUMENTS

| | | | |
|---|---|---|---|
| 2,985,576 | 5/1961 | Hollings | 176/74 |
| 3,085,954 | 4/1963 | Stohr et al. | 176/73 |
| 3,098,809 | 7/1963 | Huet | 176/81 |
| 3,106,520 | 10/1963 | Wolfe et al. | 176/68 |
| 3,179,570 | 4/1965 | LeFoll | 176/81 X |
| 3,275,525 | 9/1966 | Bloomster et al. | 176/68 |
| 3,291,700 | 12/1966 | Brossa et al. | 176/68 X |
| 3,386,887 | 6/1968 | Mogard | 176/68 X |

Primary Examiner—Peter A. Nelson
Attorney, Agent, or Firm—Stevens, Davis, Miller & Mosher

[57] ABSTRACT

In a nuclear fuel rod, a wound leaf spring member is interposed between a sheath and a stack of fuel pellets contained therein.

5 Claims, 6 Drawing Figures

FIG. 1 FIG. 2 FIG. 3
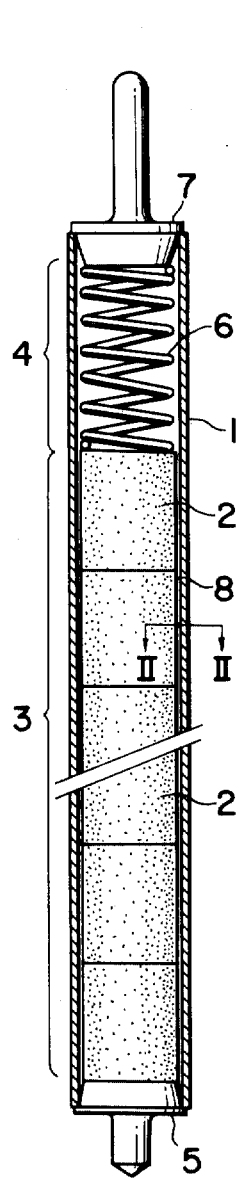
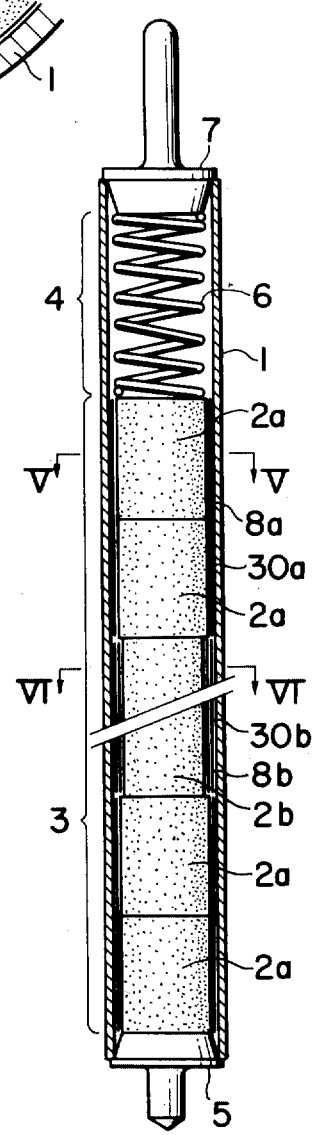

4,054,487

NUCLEAR FUEL RODS

BACKGROUND OF THE INVENTION

This invention relates to improvements relating to a fuel rod for use in nuclear reactors, and more particularly to a nuclear fuel rod of the type wherein a stack of fuel pellets is contained in a sheath.

A nuclear fuel rod now being used widely has a construction as shown in FIG. 1. Thus, a number of fuel pellets 2 are stacked in a sheath 1 made of Zircaloy (registered trade mark) to constitute an effective fuel portion 3 and a plenum chamber 4 formed above the effective fuel portion 3 for containing a coil spring 6. The opposite ends of the sheath 1 are closed by end plugs 5 and 7, respectively, which are welded to the sheath 1 in a gas tight manner. A narrow gap 8 is formed between the fuel pellets 2 and the inner wall of the sheath 1 for allowing the fuel pellets 2 to expand due to absorption of neutrons. As shown in FIG. 2, each fuel pellet generally comprises a sintered body of uranium oxide and generates a vast quantity of heat as a result of nuclear fission so that cracks 20 are often formed at random positions due to thermal stress. When cracked pieces of the fuel pellets enter into the gap 8, they are urged in the radial direction by the thermal expansion of the fuel pellet 2 thus damaging the sheath 1. In this manner, the damage of the sheath can not be completely prevented by merely providing gap 8. Although this difficulty can be obviated by increasing the width of the gap 8, too large a gap decreases heat conduction to the sheath 1. Although the sheath 1 has a high degree of ductility at the initial stage so that it can absorb local strains as the neutron irradiation proceeds its ductility decreases thus increasing fracture. Accordingly, the sheath 1 is liable to be damaged by the cracked pieces of the sintered fuel body. Further, the sheath is liable to be chemically corroded by the impurities contained in the fuel pellets or in the helium gas in the gap 8.

Among a plurality of pellets stacked in a sheath, those positioned at the axial center of the fuel rod have higher output peak than those positioned in the upper and lower regions. For this reason, it is desirable to make the gap between the sheath and the pellets contained in the central region of the sheath larger than the gap between the sheath and the pellets near the upper and lower ends.

SUMMARY OF THE INVENTION

It is an object of this invention to provide an improved nuclear fuel rod capable of preventing damage of the sheath due to cracked pieces of the fuel pellets and minimizing the temperature difference between the pellets and the sheath.

Another object of this invention is to provide a novel nuclear fuel rod in which the gap between the pellets and the sheath is varied in accordance with the variation of the output along the length of the sheath for the purpose of preventing damage of the sheath. Still another object of this invention is to provide a novel nuclear fuel rod which can minimize leakage of radioactive substances when pin holes or cracks are formed through the sheath.

A further object of this invention is to provide an improved nuclear fuel rod which can prevent stresses created in the fuel pellets by heat or neutron irradiation from being transmitted to the sheath.

According to this invention there is provided a nuclear fuel rod of the type comprising a sheath and a stack of a plurality of nuclear fuel pellets contained in the sheath wherein a wound leaf spring member is inserted in the gap between the sheath and the stack of the fuel pellets.

BRIEF DESCRIPTION OF THE DRAWINGS

In the accompanying drawings:

FIG. 1 is a longitudinal sectional view of a prior art nuclear fuel rod;

FIG. 2 is an enlarged cross-sectional view of a portion of the fuel rod shown in FIG. 1 taken along a line II—II;

FIG. 3 shows a longitudinal sectional view of one embodiment of a nuclear fuel rod embodying the invention.

DESCRIPTION OF THE PREFERRED EMBODIMENT

Figure 4:
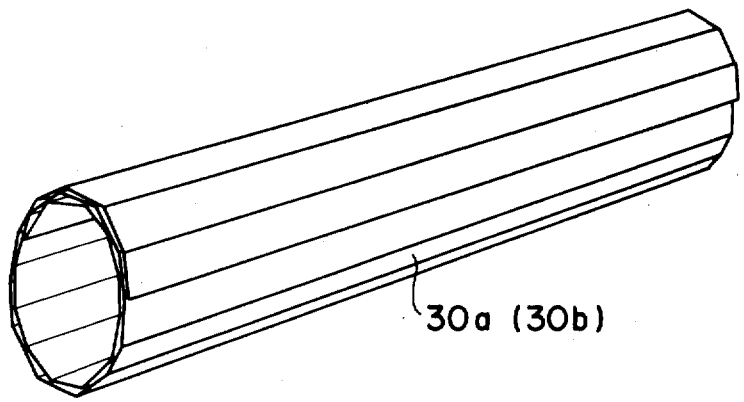
FIG. 4 is a perspective view of a wound leaf spring member utilized in the fuel rod of this invention.

Referring now to FIGS. 3 to 6, elements corresponding to those shown in FIGS. 1 and 2 are designated by the same reference numerals.

As shown in FIG. 3, the stack of a plurality of pellets contained in a sheath 1 comprises pellets 2a near the upper and lower ends of the sheth and a pellets 2b located at the axial center. According to this invention the gap 8b between the pellet 2b and the sheath is made to be larger than the gap 8a between the pellets 2a and the sheath. In other words, the outer diameter of pellet 2b is smaller than that of the end pellets 2a. Spirally wound leaf spring members are disposed in the gaps 8a and 8b for resiliently supporting the pellets.

Figure 5:
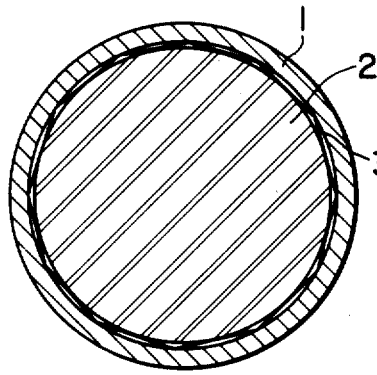
FIG. 5 is a cross-sectional view of the fuel rod shown in FIG. 3 taken along a line V—V.
Figure 6:
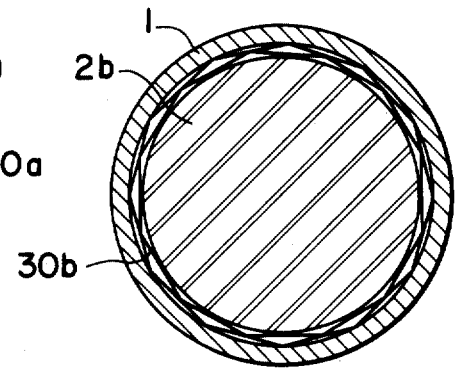
FIG. 6 is a cross-sectional view of the fuel rod shown in FIG. 3 taken along a line VI—VI.

The leaf spring members interposed between the end pellets 2a and the sheath 1 comprise one or a plurality of single convolution wound leaf members 30a as shown in FIG. 5, whereas the leaf spring member interposed between the central pellet 2b and the sheath comprises single or double convolution wound leaf spring members 30b as shown in FIGS. 4 and 6.

As shown in FIG. 4, each of the wound spring members 30a and 30b is made of a thin metal sheet having excellent heat conductivity, for example, Inconel, Incoloy or Zircaloy (all registered trade marks). The sheet has a thickness of 0.01 to 0.05 mm and a width of about 300 mm, for example. A plurality of parallel slots are formed on the surface of the sheet at a spacing of about 3.5 mm. The sheet is folded along the slots and wound into a roll having one or more convolutions.

The wound roll has an inner diameter slightly smaller than the outer diameter of the fuel pellets 2a or 2b so as to resiliently support the pellets for preventing radial displacement thereof. The wound leaf spring member 30a having a single convolution is inserted in the gap 8a whereas the wound leaf spring member 30b having two or more convolutions is inserted in the gap 8b. As shown in FIGS. 5 and 6 the wound leaf spring members are inserted in the gaps with their folds urged against the inner surface of the sheath and flat portions between the folds against the outer peripherics of the pellets. In the case of a double convolution wound leaf spring memer, the folds of the inner convolution engage the flat portions of the outer convolution, and the flat portions of the inner convolution engage the outer peripheries of the pellets.

As wound leaf spring memers inserted in the gap between the sheath 1 and the fuel pellets 2 have a high heat conductivity they decrease the temperature difference between these two members thereby efficiently preventing abnormal temperature rise of the fuel pellets. Further, the wound leaf spring members resiliently absorb destructive pressure applied by cracked pieces thereby protecting the sheath against rupture. Even when cracks or pin holes are formed through the sheath the wound leaf spring members prevent rapid leakage of radioactive substances in the sheath into the coolant outide of the sheath. Such defective sheath can be detected before the inside of the reactor becomes greatly contaminated.

As above described, by using the novel wound leaf spring members, it is possible to maintain the fuel pellets at a relatively low temperature, and to uniformly transmit heat from the fuel pellets to the sheath whereby creation of local heat spots or thermal stresses can be prevented. Furthermore, as the rate of heat conduction through the gap is not greatly influenced by the width of the gap it is possible to use a wide gap thus permitting a design capable of preventing the heat and the irradiation stress of the fuel pellets from transmitting to the sheath. In addition, as pressure is applied to the fuel pellets in the radial direction from their peripheries it is possible to absorb the stress caused by expansions due to heat and irradiation of neutrons by the plastic deformation of the high temprature regions of the fuel pellets thus decreasing the stress applied to the sheath. Furthermore, the wound leaf spring members prevent spattering of the cracked pieces of the fuel pellets which are formed during the handling of the fuel rod before use or by the thermal stress created by the neutron irradiation thus caused by the scattered cracked pieces. The wound leaf spring members also resiliently absorb the stress caused by the thermal expansion of the fuel pellets and prevent it from being applied to the sheath. Finally, the wound leaf spring members prevent leakage of radioactive substances to the outside coolant and the coolant from coming into contact with the fuel pellets.

Even when the width of the gap is made different between the central portion and the end portions of the sheath for the reason described above, the object of this invention can be accomplished by the selective use of wound leaf spring members having a single convolution or a plurality of convolutions. Where the width of the gap is constant throughout the length of the sheath only one type of wound leaf spring member may be used, in which case the wound leaf spring member may comprise a single section or a plurality of sections.

I claim:

1. In a nuclear fuel rod of the type comprising a sheath and a stack of a plurality of nuclear fuel pellets contained in said sheath, the improvement which comprises a wound leaf spring member inserted in the gap between said sheath and the stack of said fuel pellets, said wound leaf spring member being made of a metal sheet having good heat conductivity and provided with spaced parallel folds extending in the longitudinal direction, and said metal sheet being bent into a polygonal roll along said folds.

2. The improvement according to claim 1, wherein said wound leaf spring member comprises a plurality of convolutions engaging the inner surface of said sheath and the folds of the inner convolution engages the flat portions between the folds of the outer convolution.

3. The improvement according to claim 1, wherein said wound leaf spring member is divided into a plurality of sections which are stacked in the axial direction of said sheath.

4. The improvement according to claim 3, wherein the fuel pellets at the central region of the stack have an outer diameter smaller than that of the fuel pellets at the upper and lower ends of the stack, and whrein the wound leaf spring sections surrounding the fuel pellets at said upper and lower ends have a smaller number of convolutions than the wound leaf spring section surrounding the fuel pellets at said central region.

5. The improvement according to claim 1, wherein said wound leaf spring has substantially the same length as the stack of said fuel pellets.

* * * * *